(12) United States Patent
Wang et al.

(10) Patent No.: US 11,734,576 B2
(45) Date of Patent: Aug. 22, 2023

(54) COOPERATIVE NEURAL NETWORKS WITH SPATIAL CONTAINMENT CONSTRAINTS

(71) Applicant: International Business Machines Corporation, Armonk, NY (US)

(72) Inventors: Xin Ru Wang, San Jose, CA (US); Xinyi Zheng, Ann Arbor, MI (US); Douglas R. Burdick, San Jose, CA (US); Ioannis Katsis, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 367 days.

(21) Appl. No.: 16/847,795

(22) Filed: Apr. 14, 2020

(65) Prior Publication Data
US 2021/0319325 A1   Oct. 14, 2021

(51) Int. Cl.
*G06N 3/088* (2023.01)
*G06N 3/045* (2023.01)
*G06N 3/082* (2023.01)

(52) U.S. Cl.
CPC ............. *G06N 3/088* (2013.01); *G06N 3/045* (2023.01); *G06N 3/082* (2013.01)

(58) Field of Classification Search
CPC ...... G06N 3/088; G06N 3/0454; G06N 3/082; G06N 3/084
See application file for complete search history.

(56) References Cited

U.S. PATENT DOCUMENTS

| | | |
|---|---|---|
| 6,006,240 A | 12/1999 | Handley |
| 7,054,871 B2 | 5/2006 | Hu et al. |
| 8,443,278 B2 | 5/2013 | Mansfield et al. |

(Continued)

FOREIGN PATENT DOCUMENTS

| | | |
|---|---|---|
| CN | 109816107 A | 5/2019 |
| CN | 109992000 A | 7/2019 |

(Continued)

OTHER PUBLICATIONS

International Search Report dated Jul. 13, 2021.
(Continued)

*Primary Examiner* — Michael N Opsasnick
(74) *Attorney, Agent, or Firm* — Ryan, Mason & Lewis, LLP

(57) ABSTRACT

Methods, systems, and computer program products for cooperative neural networks with spatial containment constraints are provided herein. A computer-implemented method includes dividing a processing task into multiple sub-tasks; training multiple independent neural networks, such that at least some of the multiple sub-tasks correspond to different ones of the multiple independent neural networks; defining, via implementing constraint-based domain knowledge related to the processing task in connection with the multiple independent neural networks, a constraint loss for a given one of the multiple sub-tasks, the constraint loss being dependent on output from at least one of the other multiple sub-tasks; and effecting re-training of at least a portion of the multiple independent neural networks by incorporating the constraint loss into at least one of the multiple independent neural networks.

14 Claims, 5 Drawing Sheets

(56) References Cited

U.S. PATENT DOCUMENTS

| | | | |
|---|---|---|---|
| 9,268,999 | B2 | 2/2016 | Xu et al. |
| 9,753,959 | B2 | 9/2017 | Birdwell et al. |
| 10,733,433 | B2 | 8/2020 | Krishnapura Subbaraya et al. |
| 10,789,543 | B1 * | 9/2020 | Sun .................. G06N 20/00 |
| 2001/0045961 | A1 | 11/2001 | Stoakley et al. |
| 2004/0163048 | A1 | 8/2004 | McKnight et al. |
| 2006/0195782 | A1 | 8/2006 | Wang et al. |
| 2007/0061714 | A1 | 3/2007 | Stuple et al. |
| 2011/0249905 | A1 | 10/2011 | Singh et al. |
| 2017/0052941 | A1 | 2/2017 | Bastide et al. |
| 2017/0286810 | A1 * | 10/2017 | Shigenaka ........... G06V 30/194 |
| 2018/0121807 | A1 | 5/2018 | Wick et al. |
| 2018/0315193 | A1 * | 11/2018 | Paschalakis ......... G06K 9/6269 |
| 2018/0322365 | A1 * | 11/2018 | Yehezkel Rohekar ..................... G06V 10/774 |
| 2019/0156179 | A1 * | 5/2019 | Thiele .................. G06N 3/0635 |
| 2019/0287292 | A1 * | 9/2019 | Ceccaldi .................... G06T 7/11 |
| 2019/0303663 | A1 | 10/2019 | Krishnapura et al. |
| 2019/0340240 | A1 | 11/2019 | Duta |
| 2019/0384790 | A1 * | 12/2019 | Bequet ................ G06F 16/9014 |
| 2019/0392307 | A1 | 12/2019 | Liao |
| 2021/0056300 | A1 | 2/2021 | Chitta et al. |
| 2021/0117667 | A1 | 4/2021 | Mehra et al. |
| 2021/0201018 | A1 | 7/2021 | Patel et al. |

FOREIGN PATENT DOCUMENTS

| | | |
|---|---|---|
| CN | 110866602 A | 3/2020 |
| WO | 2012006509 A1 | 1/2012 |

OTHER PUBLICATIONS

Gilani et al., "Table Detection using Deep Learning", Research Gate 2017.

Schreiber et al., DeepDeSRT: Deep Learning for Detection and Structure Recognition of Tables in Document Images, 2017 14th IAPR International Conference on Document Analysis and Recognition (ICDAR), Nov. 2017.

Elowsson, A., Deep Layered Learning in MIR, 2018.

Xu et al., Neural Task Programming: Learning to Generalize Across Hierarchical Tasks, 2018.

Reeder, J., Life Long Learning in Sparse Learning Environments, 2013.

Ip.com, IPCOM000254791D, Branching Neural Networks, Aug. 2, 2018.

Ip.com, IPCOM000186133D, Dynamic Cost-Based Optimization Using Branch Prediction for Workflow Based Systems, Aug. 11, 2009.

Ip.com, IPCOM000181436D, Learning Essential Non-Linear Feature Sub-space for Pattern Classification Using Hetero-Associative Neural Networks, Apr. 2, 2009.

Stewart et al., Label-free supervision of neural networks with physics and domain knowledge. Sep. 2016.

Turner et al., SPARCNN: Spatially related convolutional neural networks. In 2016 IEEE Applied Imagery Pattern Recognition Workshop (AIPR) (pp. 1-6). IEEE Oct. 2016.

Shrivastava et al., Cooperative neural networks (CoNN): Exploiting prior independence structure for improved classification. In Advances in Neural Information Processing Systems (pp. 4126-4136). 2018.

Shrivastava et al., Learning from simulated and unsupervised images through adversarial training. In Proceedings of the IEEE conference on computer vision and pattern recognition (pp. 2107-2116) Jul. 2017.

Peter Mell, et al. The NIST Definition of Cloud Computing, Recommendations of the National Institute of Standards and Technology, US Department of Commerce, Special Publicaiton 800-145, Sep. 2011, pp. 1-7.

List of IBM Patents or Patent Applications Treated as Related, Aug. 4, 2020, pp. 1-2.

Chi et al. Complicated Table Structure Recognition, pp. 1-9. (Year: 2019).

* cited by examiner

COOPERATIVE NEURAL NETWORKS WITH SPATIAL CONTAINMENT CONSTRAINTS

FIELD

The present application generally relates to information technology and, more particularly, to data processing techniques.

BACKGROUND

Training neural network models in an end-to-end fashion can successfully solve a variety of tasks. However, end-to-end models commonly consume significant amounts of data and memory. Further, in many machine learning tasks, availability of fully labeled data can be limited, while larger amounts of partially labeled data exist that cannot be efficiently utilized by conventional models.

SUMMARY

In one embodiment of the present invention, techniques for cooperative neural networks with spatial containment constraints are provided. An exemplary computer-implemented method can include dividing a processing task into multiple sub-tasks, and training multiple independent neural networks, such that at least some of the multiple sub-tasks correspond to different ones of the multiple independent neural networks. Such a method also includes defining, based at least in part on constraint-based domain knowledge related to the processing task, at least one constraint loss for a given one of the multiple sub-tasks, the at least one constraint loss being dependent on output from at least one of the other multiple sub-tasks, and re-training at least a portion of the multiple independent neural networks, the re-training being dependent on using the at least one constraint loss.

In another embodiment of the invention, an exemplary computer-implemented method can include dividing a processing task into multiple sub-tasks, and training a neural network having multiple divergent branches therein, such that at least some of the multiple sub-tasks correspond to different ones of the multiple divergent branches of the neural network. Such a method also includes defining, based at least in part on constraint-based domain knowledge related to the processing task, at least one constraint loss for a given one of the multiple sub-tasks, the at least one constraint loss being dependent on output from at least one of the other multiple sub-tasks, and re-training at least a portion of the neural network, the re-training being dependent on using the at least one constraint loss.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
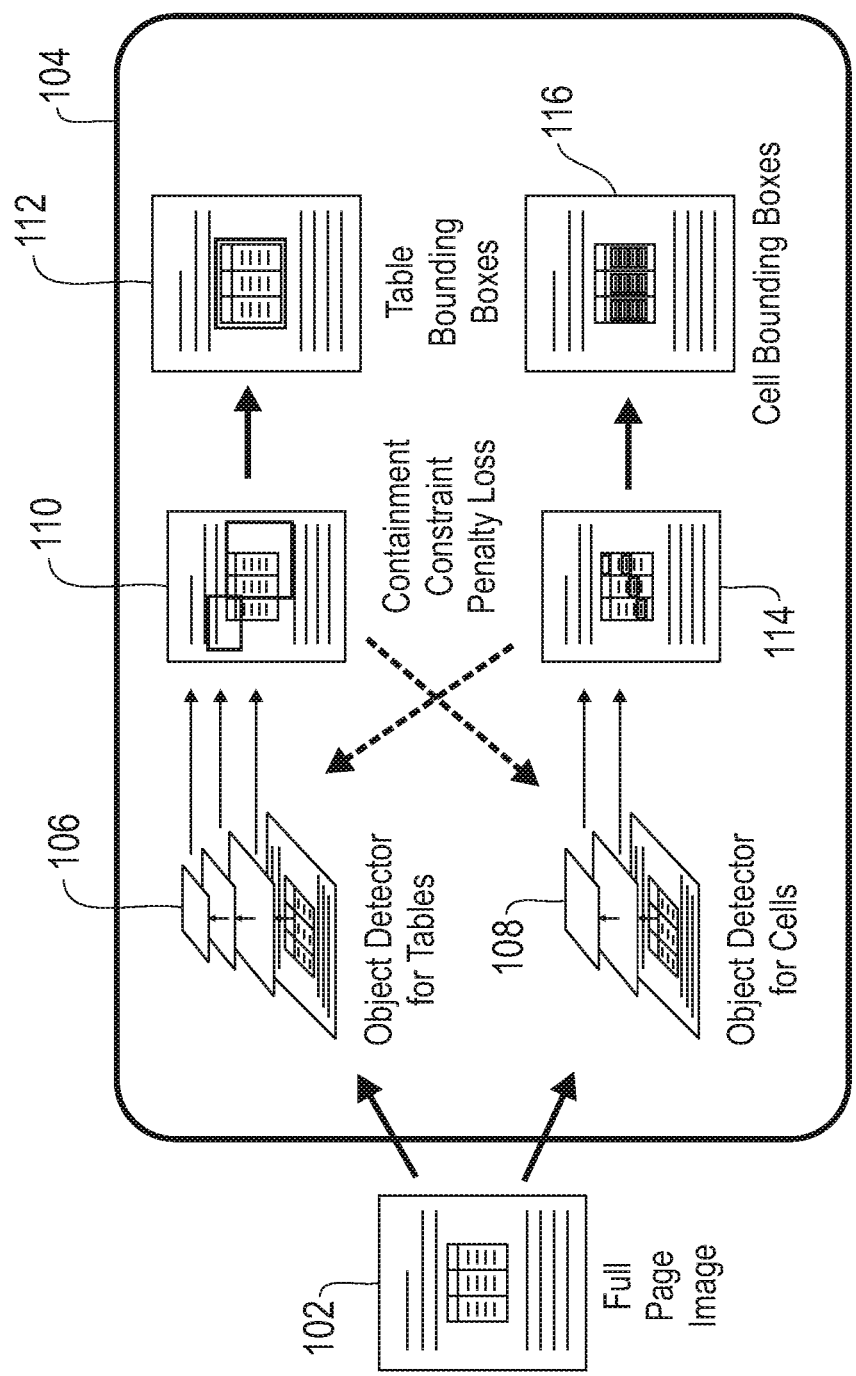
FIG. 1 is a diagram illustrating system architecture, according to an example embodiment of the invention.

As described herein, an embodiment of the present invention includes cooperative neural networks with spatial containment constraints. More specifically, at least one embodiment includes generating and/or implementing a constraint-based neural network training framework for machine learning tasks. Such a framework, in one or more embodiments, includes implementing the following steps: dividing the given task into multiple sub-tasks; training at least one independent neural network for each of the respective sub-tasks (potentially using different datasets, for example); leveraging constraint-based domain knowledge related to the given task and defining a constraint loss which involves the results of each sub-task; and training each neural network model sequentially in an adversarial style using prediction results of one or more other models.

Accordingly, as at least partially highlighted above, at least one embodiment includes dividing a given task into multiple sub-tasks (e.g., separately detecting tables and cells of those tables), training a separate model for each sub-task with potentially different datasets, defining and/or learning at least one spatial constraint relationship between outputs of each subtask, adding at least one loss to each subtask model, penalizing constraint violations and continue training, and modifying and/or fine-tuning the framework further (for example, with only constraint loss with unlabeled data).

Such a framework of at least one embodiment is also referred to herein as a constraint-based cooperative neural network (C2NN), in that multiple neural networks cooperate with each other in connection with one or more predefined constraints. C2NN provides at least the following advantages over conventional modeling and/or analysis approaches. For example, C2NN can make increased use (e.g., full use) of partially labelled data to capture robust local features and reserve global structure simultaneously. Additionally, during a training stage associated with an example embodiment, each model is trained separately, such that partially labeled data can be used to train more robust sub-task models. As also encompassed as part of a training stage, multiple neural networks cooperate with each other to reserve the global structure of the given (overall) task.

Another advantage over conventional approaches includes memory efficiency. For example, training a substantial end-to-end model often requires considerable graphics processing unit (GPU) and/or tensor processing unit (TPU) memory. However, in at least one embodiment, because at any time of C2NN implementation, only one neural network for a sub-task is trained on the fly, C2NN can be used to train smaller sub-models under resource intensive circumstances. Additionally, in one or more embodiments, C2NN can be used to enhance domain adaptation. For example, during a training stage, C2NN can facilitate adaptation of current models into a different domain with limited labelled data by reserving the same constraints owned by both source and target domains.

Accordingly, and as detailed herein, one or more embodiments include incorporating partially labelled data (e.g., for training purposes). End-to-end models are often resource intensive because back-propagation is effective to neurons of the model involved in the training sample. However, at least one embodiment includes only training a (relatively smaller) sub-task model in each time stamp.

Further, at least one embodiment includes implementing and/or facilitating cooperation across multiple neural networks by independently detecting at least one aspect of a problem that then becomes at least one constraint that the other network(s) can incorporate. By way merely of illustration, such a constraint can be related to containment, for example, such that the output of one network needs to be physically contained within the output of another network.

By way of additional example, by using spatial relationships between sub-objects, one or more embodiments can include using partially labelled data that do not contain all labels required by the full task, incorporating domain knowledge to improve training speed and accuracy, and learning from unlabeled data.

FIG. 1 depicts an example of a constraint loss-based training scheme with table recognition. However, one or more embodiments can be implemented and/or applied to any networks whose outputs have some constraint relationship (e.g., containment constraints, temporal consistency constraints, etc.). For example, at least one embodiment can include implementation within the context of at least one temporal similarity constraint, wherein two networks, each predicting future and past events, can have similar results and the pixel-level similarity of their outputs becomes a constraint.

As shown in FIG. 1, a table boundary framework 104 can use a cell detection network by leveraging the fact that tables must contain at least some cells. In a training stage, besides a regression and classification loss, one or more embodiments include adding a piecewise constraint loss, which penalizes the detection probability of unrealistic tables when considering cell locations. This novel cell constraint based loss function may be added to any detection network.

Accordingly, as depicted in FIG. 1, the table boundary framework 104 includes an object detector for tables 106 and an object detector for cells 108. The object detector for tables 106 detects one or more tables 110 in the input (full page) image 102, while the object detector for cells 108 detects one or more cells 114 in the input (full page) image 102. From the one or more detected tables 110, candidate table bounding boxes 112 are determined. From the one or more detected cells 114, one or more cell bounding boxes 116 are determined.

One or more embodiments include using a guided cell network to generate a set of cell bounding boxes (e.g., cell bounding boxes 116). Given the set of cell bounding boxes, such an embodiment can include defining Boolean operators wherein inputs include an inner box and an outer box, wherein such inputs define the boundaries of a mask input area. The penalty indicator is true when less than a certain percentage of the table has cells.

In an inference stage, one or more embodiments include ranking proposed bounding boxes by considering detection probabilities as well as the presence of cells inside and outside of the table. Such an embodiment can also include defining a constraint coefficient for each bounding box, and for each boundary of a table bounding box, calculating the number of cells outside of the table subtracted by the number of cells inside of the table. For any pair of bounding boxes overlapped with each other more than a given percentage, such an embodiment includes discarding the bounding box with the higher constraint coefficient.

In connection with the above-noted example of table recognition, the fact that cells must lie inside of a table represents a spatial constraint between tables and cells. Using conventional modelling approaches, independent neural networks detecting each aspect (cells and tables) could not leverage this type of global constraint. However, as detailed in the example use case above, one or more embodiments can include leveraging the output of each individual model and/or network and the domain knowledge of how cells and tables are related to improve the detection of both during training and inference stages.

Additional example use cases for implementing one or more embodiments of the invention can include zero-shot learning. For instance, when detecting a new type of animal, such as a zebra, one could have a network pre-trained as a horse detector and another network pre-trained as a stripes detector. Knowing that zebras are similar in some respects to horses but with stripes, one can add a penalty to the horse detector such that any detection without the stripe detector also being activated inside the animal is penalized. Similarly, any stripe detector not within the horse detector could also be penalized. Ultimately, the networks could be adapted to detect zebras without ever having any labelled instances of zebras.

Figure 2:
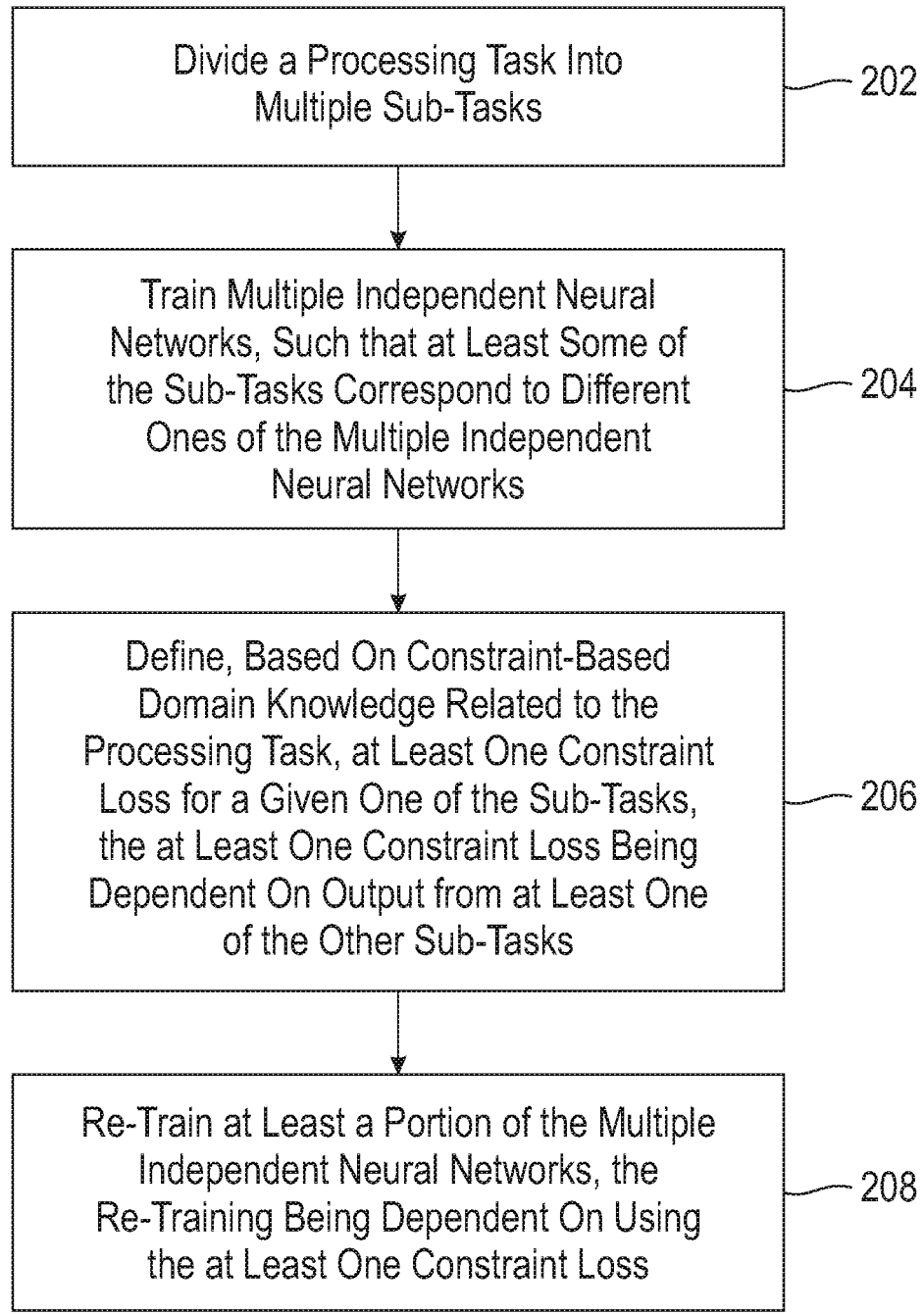
FIG. 2 is a flow diagram illustrating techniques according to an embodiment of the invention.

FIG. 2 is a flow diagram illustrating techniques according to an embodiment of the present invention. Step 202 includes dividing a processing task into multiple sub-tasks. The multiple sub-tasks can correspond to different parts of a given object and/or to at least a part of another one of the multiple sub-tasks. Also, in at least one embodiment, the processing task includes determining structure and location of one or more tables in a document. In such an embodiment, a containment constraint can be between cells and table boundaries for table recognition. For instance, cells should always be contained inside of tables, and tables should always contain cells. Therefore, when a cell is detected outside of any tables detected by the table network, an extra penalty is added to the cell network for the extra cell detection. If a table is detected wherein the density of detected cells within the table is low or if there are several cells detected just outside of the table, an extra penalty is added to the table network.

Step 204 includes training multiple independent neural networks, such that at least some of the multiple sub-tasks correspond to different ones of the multiple independent neural networks. In at least one embodiment, training the multiple independent neural networks can include training the multiple independent neural networks such that each network specializes in detecting at least two types of objects, wherein the at least two types of objects are known to have at least one spatial relationship with each other (e.g., a containment relationship).

Step 206 includes defining, based at least in part on constraint-based domain knowledge related to the processing task, at least one constraint loss for a given one of the multiple sub-tasks, said at least one constraint loss being dependent on output from at least one of the other multiple sub-tasks. In at least one embodiment, defining the at least one constraint loss includes automatically discovering the corresponding constraint through analysis of labelled data.

Step 208 includes re-training at least a portion of the multiple independent neural networks, said re-training being dependent on using said at least one constraint loss. In at least one embodiment, re-training includes incorporating the at least one constraint loss into at least one of the multiple independent neural networks, in view of at least one spatial relationship being violated between one or more outputs of the at least one neural network and at least a portion the other neural networks for any given input. Such an embodiment can also include backpropagating the at least one constraint loss throughout the at least one neural network by modifying a weight assigned to each of one or more units in the at least one neural network towards a value that would have produced an output satisfying the constraint. Additionally or alternatively, in one or more embodiments, re-training includes using the at least one constraint loss in a supervised setting or in an unsupervised setting.

Also, an additional embodiment of the invention includes dividing a processing task into multiple sub-tasks, and training a neural network having multiple divergent branches therein, such that at least some of the multiple sub-tasks correspond to different ones of the multiple divergent branches of the neural network. Such an embodiment also includes defining, based at least in part on constraint-based domain knowledge related to the processing task, at least one constraint loss for a given one of the multiple sub-tasks, the at least one constraint loss being dependent on output from at least one of the other multiple sub-tasks, and re-training at least a portion of the neural network, the re-training being dependent on using the at least one constraint loss.

The techniques depicted in FIG. 2 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 3:
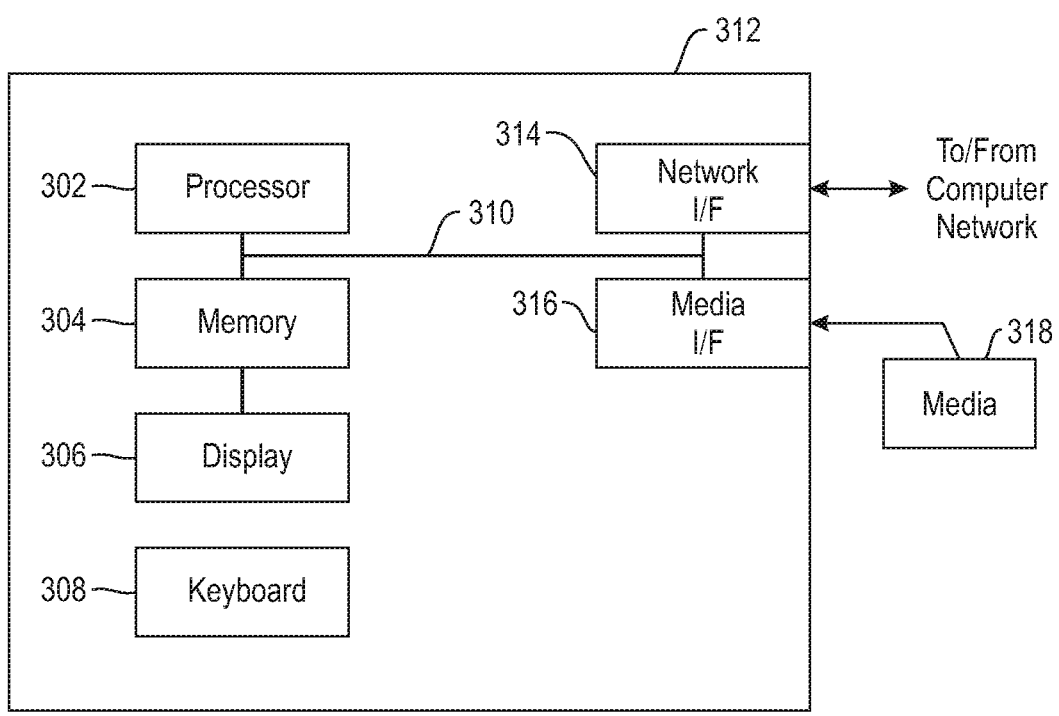
FIG. 3 is a system diagram of an exemplary computer system on which at least one embodiment of the invention can be implemented.

Additionally, an embodiment of the present invention can make use of software running on a computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 302. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
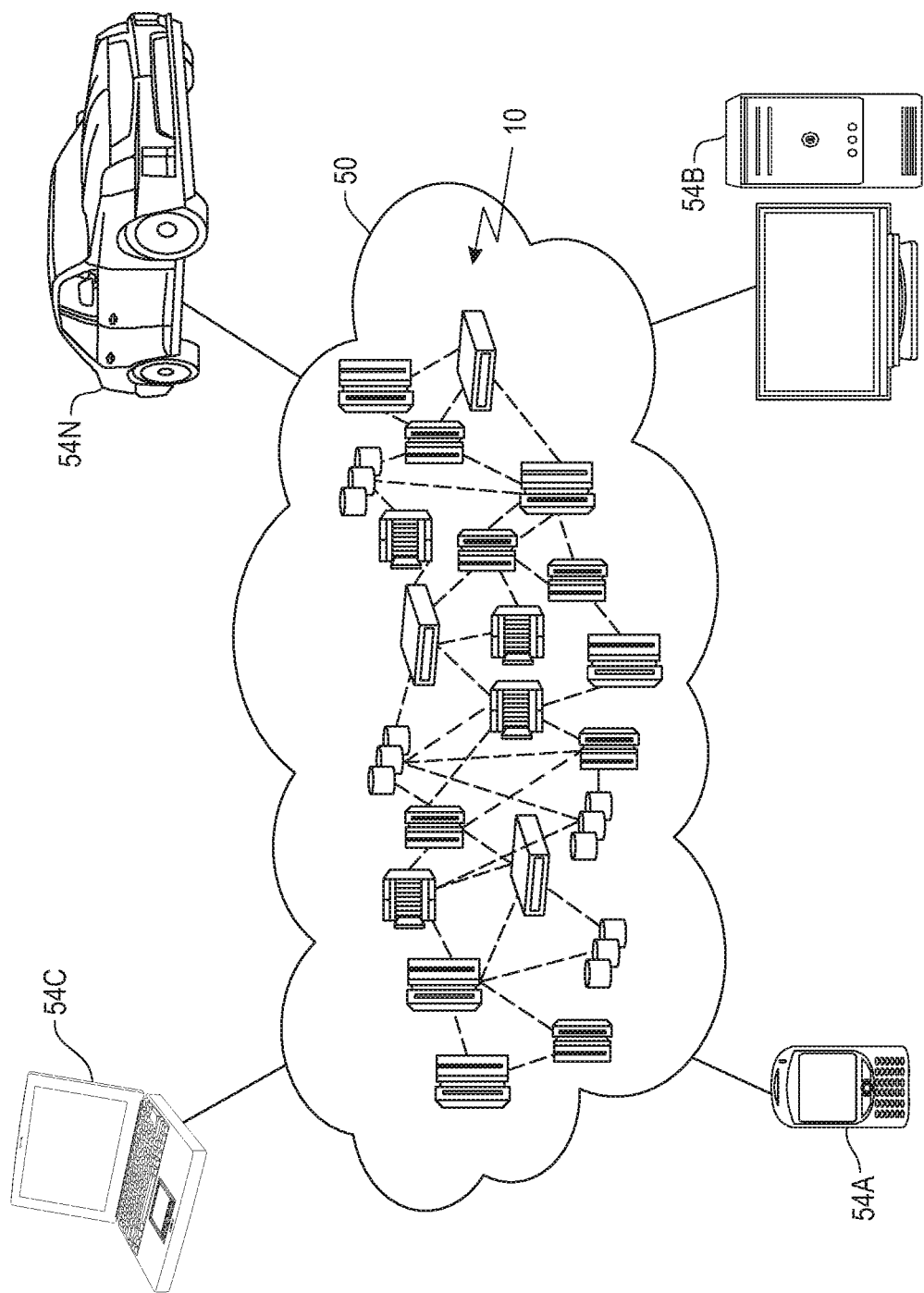
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
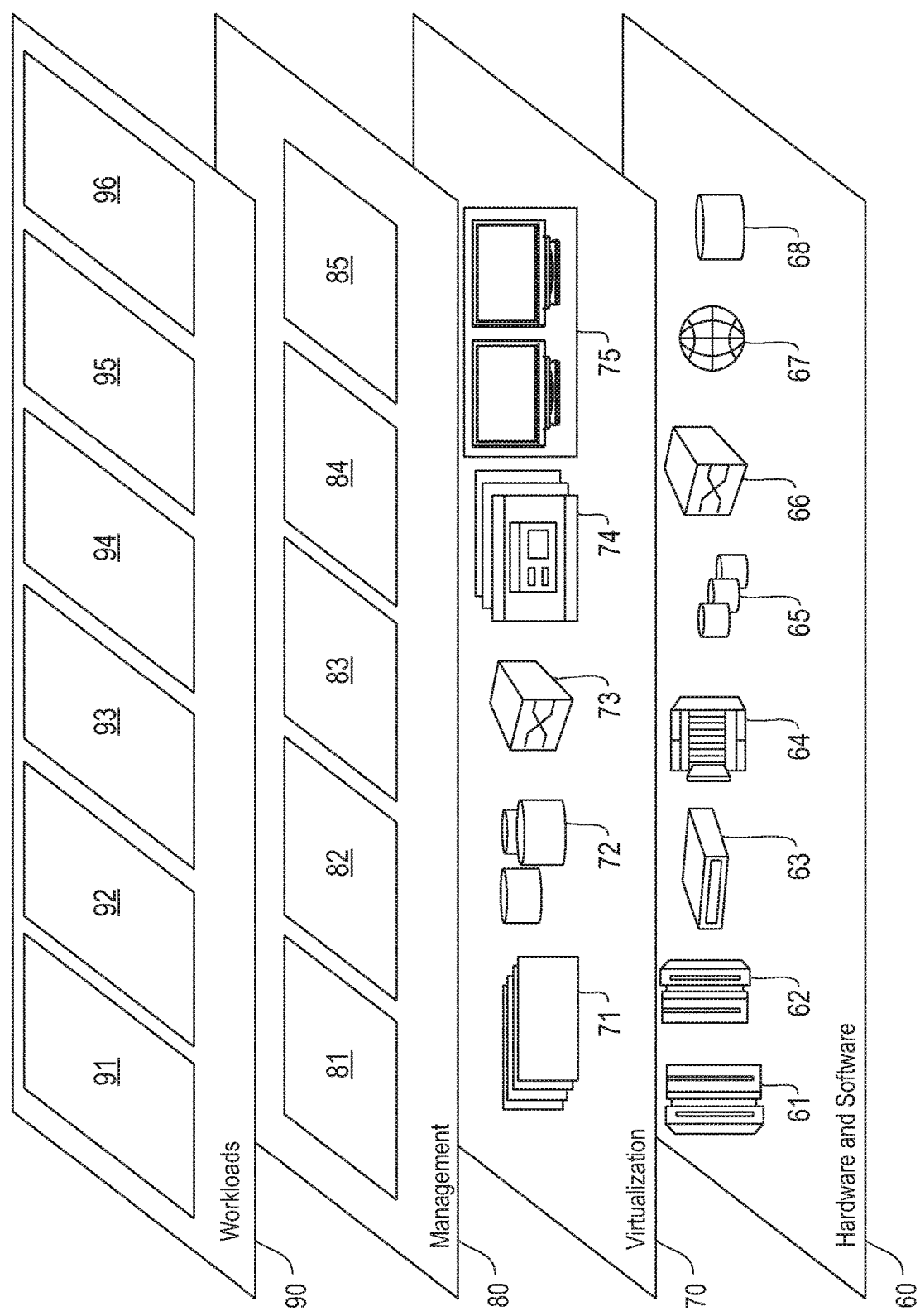
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cooperative neural networks with spatial containment constraints 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide beneficial effects such as, for example, productively utilizing partially labelled data that do not contain all labels required by the full task, incorporating domain knowledge to improve network training speed and accuracy, and learning from unlabeled data.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    dividing a processing task into multiple sub-tasks;
    training multiple independent neural networks, wherein each of the multiple sub-tasks corresponds to a respective one of the multiple independent neural networks, wherein training comprises training the multiple independent neural networks such that each of the multiple independent neural networks detects at least two types of objects, wherein the at least two types of objects have at least one spatial relationship with each other, and wherein the at least one spatial relationship comprises at least one containment relationship;
    defining, based at least in part on constraint-based domain knowledge related to the processing task, at least one constraint loss for a given one of the multiple sub-tasks, said at least one constraint loss being dependent on output from at least one of the other multiple sub-tasks; and
    re-training at least a portion of the multiple independent neural networks, wherein said re-training comprises incorporating the at least one constraint loss into at least one of the multiple independent neural networks, in view of the at least one spatial relationship being violated between one or more outputs of the at least one neural network and at least a portion one or more other of the multiple independent neural networks for any given input;
    wherein the method is carried out by at least one computing device.

2. The computer-implemented method of claim 1, wherein the multiple sub-tasks correspond to different parts of a given object.

3. The computer-implemented method of claim 1, wherein one of the multiple sub-tasks corresponds to at least a part of another one of the multiple sub-tasks.

4. The computer-implemented method of claim 1, wherein the processing task comprises determining structure and location of one or more tables in a document.

5. The computer-implemented method of claim 1, comprising:
    backpropagating the at least one constraint loss throughout the at least one neural network by modifying a weight assigned to each of one or more units in the at least one neural network towards a value that would have produced an output satisfying the constraint.

6. The computer-implemented method of claim 1, wherein said defining the at least one constraint loss comprises automatically discovering the corresponding constraint through analysis of labelled data.

7. The computer-implemented method of claim 1, wherein said re-training comprises using the at least one constraint loss in a supervised setting.

8. The computer-implemented method of claim 1, wherein said re-training comprises using the at least one constraint loss in an unsupervised setting.

9. A computer program product comprising a computer readable storage medium having program instructions embodied therewith, the program instructions executable by a computing device to cause the computing device to:
  divide a processing task into multiple sub-tasks;
  train multiple independent neural networks, wherein each of the multiple sub-tasks corresponds to a respective one of the multiple independent neural networks, wherein training comprises training the multiple independent neural networks such that each of the multiple independent neural networks detects at least two types of objects, wherein the at least two types of objects have at least one spatial relationship with each other, and wherein the at least one spatial relationship comprises at least one containment relationship;
  define, based at least in part on constraint-based domain knowledge related to the processing task, at least one constraint loss for a given one of the multiple sub-tasks, said at least one constraint loss being dependent on output from at least one of the other multiple sub-tasks; and
  re-train at least a portion of the multiple independent neural networks, wherein said re-training comprises incorporating the at least one constraint loss into at least one of the multiple independent neural networks, in view of the at least one spatial relationship being violated between one or more outputs of the at least one neural network and at least a portion one or more other of the multiple independent neural networks for any given input.

10. A system comprising:
  a memory; and
  at least one processor operably coupled to the memory and configured for:
    dividing a processing task into multiple sub-tasks;
    training multiple independent neural networks, wherein each of the multiple sub-tasks corresponds to a respective one of the multiple independent neural networks, wherein training comprises training the multiple independent neural networks such that each of the multiple independent neural networks detects at least two types of objects, wherein the at least two types of objects have at least one spatial relationship with each other, and wherein the at least one spatial relationship comprises at least one containment relationship;
    defining, based at least in part on constraint-based domain knowledge related to the processing task, at least one constraint loss for a given one of the multiple sub-tasks, said at least one constraint loss being dependent on output from at least one of the other multiple sub-tasks; and
    re-training at least a portion of the multiple independent neural networks, wherein said re-training comprises incorporating the at least one constraint loss into at least one of the multiple independent neural networks, in view of the at least one spatial relationship being violated between one or more outputs of the at least one neural network and at least a portion one or more other of the multiple independent neural networks for any given input.

11. A computer-implemented method comprising:
  dividing a processing task into multiple sub-tasks;
  training a neural network having multiple divergent branches therein, wherein each of the multiple sub-tasks corresponds to a respective one of the multiple divergent branches of the neural network, wherein training comprises training the neural network to detect at least two types of objects, wherein the at least two types of objects have at least one spatial relationship with each other, and wherein the at least one spatial relationship comprises at least one containment relationship;
  defining, based at least in part on constraint-based domain knowledge related to the processing task, at least one constraint loss for a given one of the multiple sub-tasks, said at least one constraint loss being dependent on output from at least one of the other multiple sub-tasks; and
  re-training at least a portion of the neural network, wherein said re-training comprises incorporating the at least one constraint loss into at least one of the multiple divergent branches of the neural network, in view of the at least one spatial relationship being violated between one or more outputs of the at least one divergent branch and at least a portion one or more other of the multiple divergent branches of the neural network for any given input;
  wherein the method is carried out by at least one computing device.

12. The computer-implemented method of claim 11, wherein the multiple sub-tasks correspond to different parts of a given object.

13. The computer-implemented method of claim 11, wherein one of the multiple sub-tasks corresponds to at least a part of another one of the multiple sub-tasks.

14. The computer-implemented method of claim 11, comprising:
  backpropagating the at least one constraint loss throughout the neural network by modifying a weight assigned to each of one or more units in the neural network towards a value that would have produced an output satisfying the at least one constraint.

\* \* \* \* \*